United States Patent
Kaidu (10) Patent No.: US 10,224,844 B2
(45) Date of Patent: Mar. 5, 2019

(54) MOTOR DRIVING CONTROLLER

(71) Applicant: MINEBEA MITSUMI INC., Kitasaku-gun, Nagano (JP)

(72) Inventor: Hiroyuki Kaidu, Iwata (JP)

(73) Assignee: MINEBEA MITSUMI, INC., Nagano (JP)

( * ) Notice: Subject to any disclaimer, the term of this patent is extended or adjusted under 35 U.S.C. 154(b) by 0 days.

(21) Appl. No.: 15/437,691

(22) Filed: Feb. 21, 2017

(65) Prior Publication Data
US 2017/0279387 A1 Sep. 28, 2017

(30) Foreign Application Priority Data
Mar. 28, 2016 (JP) .................................. 2016-062965

(51) Int. Cl.
*H02P 3/06* (2006.01)
*H02P 6/24* (2006.01)
*H02P 6/17* (2016.01)
*H02P 27/06* (2006.01)
*H02P 6/182* (2016.01)

(52) U.S. Cl.
CPC ................ *H02P 6/17* (2016.02); *H02P 6/182* (2013.01); *H02P 27/06* (2013.01)

(58) Field of Classification Search
None
See application file for complete search history.

(56) References Cited

U.S. PATENT DOCUMENTS

| 4,197,489 | A | * | 4/1980 | Dunn | G11B 19/20 310/67 R |
| 4,415,844 | A | * | 11/1983 | Mendenhall | H02P 6/06 318/400.04 |
| 5,264,775 | A | * | 11/1993 | Namuduri | H02P 6/085 318/599 |
| 2001/0011847 | A1 | | 8/2001 | Laurent | |
| 2012/0049778 | A1 | | 3/2012 | Kojima et al. | |

FOREIGN PATENT DOCUMENTS

| JP | 11-113281 A | 4/1999 |
| JP | 2001-224196 A | 8/2001 |
| JP | 2002-209396 A | 7/2002 |
| JP | 2011-055651 A | 3/2011 |
| JP | 2012-138983 A | 7/2012 |
| WO | 2010/143452 A1 | 11/2012 |

OTHER PUBLICATIONS

Office Action dated Feb. 27, 2018 for the corresponding Japanese Application No. 2016-062965 and English translation.
Decision of Refusal dated Oct. 2, 2018 for the corresponding Japanese Application No. 2016-062965 and English translation.

* cited by examiner

*Primary Examiner* — Bentsu Ro
(74) *Attorney, Agent, or Firm* — Pearne & Gordon LLP (57) ABSTRACT

A motor driving controller comprising a motor driver applying voltage to each phase of a motor and driving the motor, a rotary position detection circuit detecting a rotary position of a rotor and generating rotary position information, and a control part outputting, to the motor driver, a driving control signal to execute control based on the detected rotary position information, so that an overlap energization operation at a time of energization switching is repeated in a predetermined pattern.

12 Claims, 8 Drawing Sheets

MOTOR DRIVING CONTROLLER

CROSS REFERENCE TO RELATED APPLICATIONS

This application claims the benefit of Japanese Patent Application No. 2016-062965, filed Mar. 28, 2016, which is hereby incorporated by reference in its entirety.

BACKGROUND

Technical Field

The present disclosure relates to a motor driving controller.

Background Art

In a general motor driven by switching energization to a coil, an electromagnetic vibration component by energization switching is one of main factors, which worsen vibrations, and some countermeasures need to be taken. In a motor with a use rotation speed determined, resonance can be avoided in the manner of rotation at the use rotation speed for avoiding resonance. However, for example, like an axial fan motor, in a motor where a vibration peak value at all the rotation speeds from a halt to a maximum rotation speed has to be equal to or lower than a fixed value, the above-mentioned method for avoiding resonance cannot be used and it is troublesome to conceive of a countermeasure.

Japanese Unexamined Patent Application Publication No. 2011-55651 describes a motor controller for restricting occurrence of noises based on vibrations of a stator due to resonance at a natural frequency of a motor. The motor controller described in Japanese Unexamined Patent Application Publication No. 2011-55651 comprises a rotation speed calculation part for calculating a rotation speed of a rotor and a modulation rate adjustment part for adjusting a modulation rate to an inverter on the basis of a rotation speed calculated by the rotation speed calculation part and the natural frequency of the stator. This motor controller prevents occurrence of a resonance phenomenon caused by a frequency of a harmonic component and a natural frequency F of the stator, thereby to restrict occurrence of noises due to vibrations of the stator.

The motor controller described in Japanese Unexamined Patent Application Publication No. 2011-55651 needs to adjust a modulation ratio to an inverter at every frequency of a PWM (Pulse Width Modulation) signal, as in 180-degrees conduction. Due to this, the following problem has occurred. Namely, a microcomputer with high processing capability is needed and therefore, the costs increase.

The present disclosure is related to providing a motor driving controller, which can evade resonance at a natural frequency of a motor occurring in a predetermined rotation speed range, while the motor driving controller is configured to be inexpensive.

SUMMARY

The motor driving controller according to the present disclosure has the following configuration. Namely, the motor driving controller according to one aspect of the present disclosure comprises a motor driver applying voltage to each phase of a motor and driving the motor, a rotary position detection circuit detecting a rotary position of a rotor and generating rotary position information, and a control part outputting, to the motor driver, a driving control signal execute control based on the detected rotary position information, so that an overlap energization operation at a time of energization switching is repeated in a predetermined pattern.

The other configurations will be explained in connection with embodiments.

According to the present disclosure, it is possible to provide a motor driving controller, which can evade resonance at a natural frequency of a motor occurring in a predetermined rotation speed range, while the motor driving controller is configured to be inexpensive.

BRIEF DESCRIPTION OF THE DRAWINGS

FIGS. 5A to 5C are flowcharts showing energization control of the motor driving controller according to the present embodiment.

FIGS. 8A and 8B are flowcharts showing energization control of the motor driving controller according to a variational example.

DETAILED DESCRIPTION

An embodiment of the present disclosure will be explained in detail below with reference to each drawing.

Figure 1:
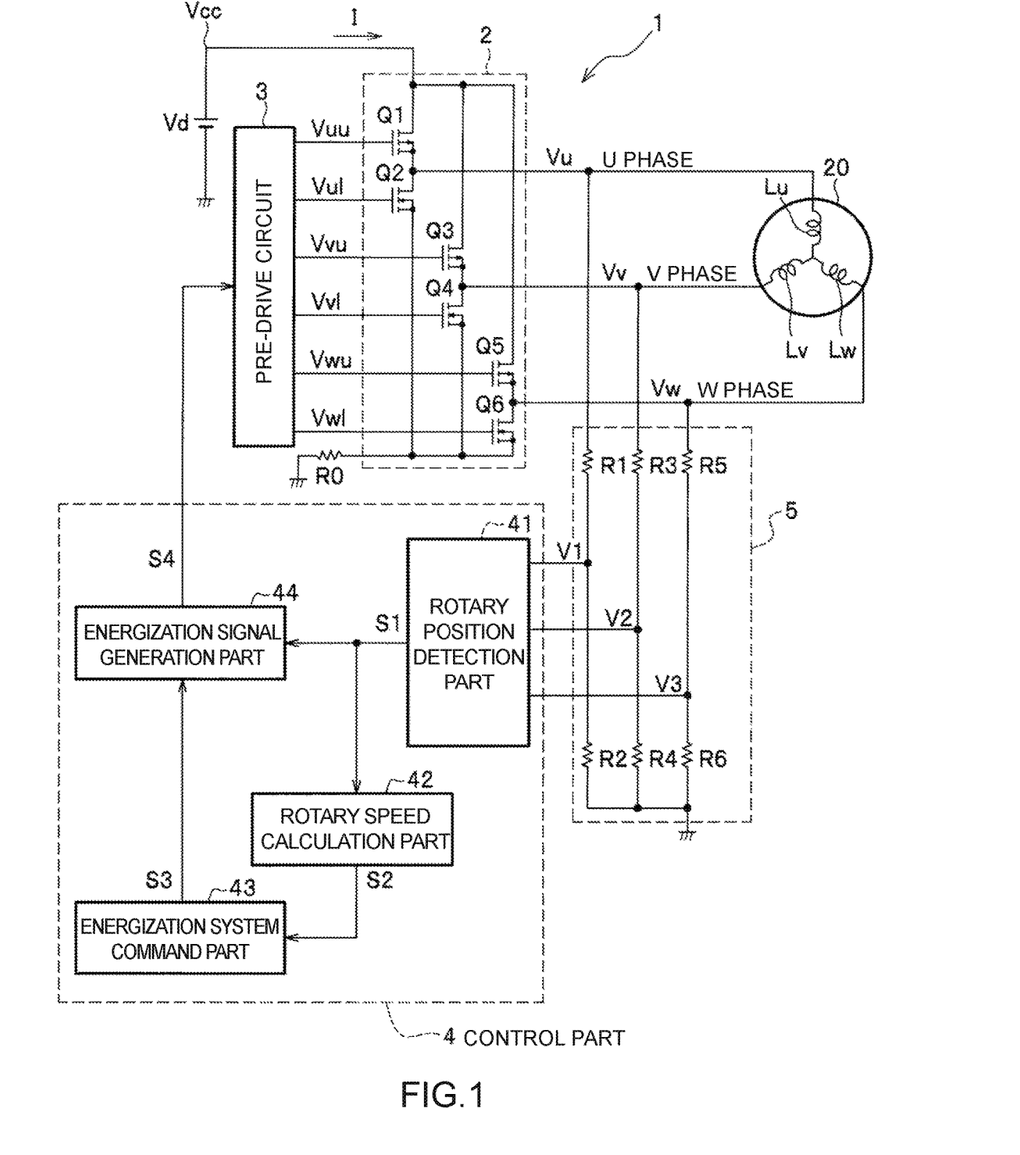
FIG. 1 is a block diagram showing a circuit configuration of a motor driving controller according to a present embodiment.

FIG. 1 is a block diagram showing a circuit configuration of a motor driving controller according to the present embodiment.

In FIG. 1, a motor 20 according to the present embodiment is a three-phase brushless DC motor as well as comprises coils Lu, Lv, Lw of respective phases and a (non-illustrated) rotor. The ends of these coils Lu, Lv and Lw are Y-connected. The other ends of the coils Lu, Lv and Lw are connected to a U phase output, a V phase output and a W phase output of an inverter circuit 2, respectively, and a three phase alternating current is supplied from the inverter circuit 2, so that the motor 20 is driven to rotate.

A driving controller 1 (one example of the motor driving controller) of the motor 20 comprises the inverter circuit 2 and a pre-drive circuit 3 (one example of a motor driver) for driving the motor 20, as well as a rotary position detection circuit 5 to detect a rotary position of the rotor and generate rotary position information. The driving controller 1 further comprises a control part 4 to output a driving control signal S4 (described below) to a motor driver. The driving controller 1 is connected to a DC power supply Vd and connected to the motor 20 through three phases of U phase wiring, V phase wiring and W phase wiring. The driving controller 1 applies driving voltage to the motor 20 and control rotation of the motor 20. Terminal voltage Vu, Vv and Vw are applied to the U phase, the V phase and the W phase, respectively.

The motor driver includes the inverter circuit 2 and the pre-drive circuit 3. The DC power supply Vd applies power supply voltage Vcc to the motor driver and supplies electric power. A power supply current I flows from the DC power supply Vd to the inverter circuit 2. The motor driver receives electric power supply from the DC power supply Vd and applies a driving current, based on the driving control signal S4 from the control part 4, to the coils Lu, Lv and Lw of the U phase, the V phase and the W phase of the motor 20, thereby to rotate the rotor. The motor driver drives the motor 20 with a sine wave driving.

The inverter circuit 2 is connected to the pre-drive circuit 3 (a part of the motor driver) and the coils Lu, Lv, Lw of respective phases of the motor 20. The inverter circuit 2 energizes the coils Lu, Lv, Lw of respective phases of the motor 20 on the basis of drive signals Vuu to Vwl of the pre-drive circuit 3.

The inverter circuit 2 comprises a switch leg of the U phase, to which switching elements Q1, Q2 are connected in series, a switching leg of the V phase, to which switching elements Q3, Q4 are connected in series, and a switching leg of the W phase, to which switching elements Q5, Q6 are connected in series. These switching elements Q1 to Q6 are for example FETs (Field Effect Transistor) and may be IGBTs (Insulated Gate Bipolar Transistor). The inverter circuit 2 is connected to the DC power supply Vd and further connected to a resistance element R0.

The switching legs of the U phase, the V phase and the W phase have the switching elements Q1, Q3, Q5 on an upper arm side and the switching elements Q2, Q4, Q6 on a lower arm side. Drain terminals of the switching elements Q1, Q3 and Q5 are respectively connected to a positive pole of the DC power supply Vd. Source terminals of the switching elements Q1, Q3, Q5 are respectively connected to drain terminals of the switching elements Q2, Q4, Q6, and from these connection points, alternating current signals of the U phase, the V phase and the W phase are outputted, respectively. Source terminals of the switching elements Q2, Q4 and Q6 are respectively connected to the ground (a negative pole of the DC power supply Vd) via a resistance element R0. Gate terminals of the switching elements Q1 to Q6 are respectively connected to the pre-drive circuit 3.

The inverter circuit 2 receives electric power supply from the DC power supply Vd and applies a three-phase AC current to the U phase wiring, the V phase wiring and the W phase wiring of the motor 20, when the drive signals Vuu to Vwl are inputted from the pre-drive circuit 3.

The pre-drive circuit 3 (a part of the motor driver) constitutes the motor driver in combination with the inverter circuit 2 to be connected thereto, and is connected to the control part 4. The pre-drive circuit 3 comprises, for example, six gate drive circuits and generates the drive signals Vuu to Vwl to drive the inverter circuit 2.

The control part 4 comprises a rotary position detection part 41, a rotary speed calculation part 42, an energization system command part 43 and an energization signal generation part 44 as well as is included in a microcomputer. The respective parts may be realized by software and what virtually represent the functions.

The rotary position detection part 41 receives rotary position information (phase voltage V1, V2 and V3) of the rotor, the rotary position information being detected by the rotary position detection circuit 5 including resistance elements R1 to R6, and generates a position detection signal S1 corresponding to the rotary position information. In the present embodiment, the rotary position detection circuit 5 detects counter electromotive force of each phase and detects the rotary position. The method for detecting the rotary position is not limited to the method using the configuration in which counter electromotive force is detected as in the present embodiment, and the rotary position, for example, may be detected with a configuration using various sensors such as a Hall sensor.

The rotary speed calculation part 42 calculates the rotary speed on the basis of the position detection signal S1 and generates rotary speed information S2.

The energization system command part 43 generates, based on the rotary speed information S2 output from the rotary speed calculation part 42, an energization command signal S3 to give a command, so that performing and stopping overlap energization at the time of energization switching are repeated in a predetermined pattern when the rotary speed is in a predetermined rotary speed range. Concretely, in the present embodiment, the energization system command part 43 generates the energization command signal S3 to give a command, so that performing and stopping the overlap energization at the time of the energization switching are alternately repeated in every energization switching timing.

The energization signal generation part 44 receives the position detection signal S1 and the energization command signal S3, and generates a drive control signal S4.

The control part 4 outputs, to the pre-drive circuit 3 (a part of the motor driver), the drive control signal S4 to execute control, so that the performing and the stopping the overlap energization at the time of the energization switching are alternately repeated, on the basis of the rotary position information (phase voltage V1, V2 and V3) detected by the rotary position detection circuit 5. It is not particularly limited whether the control part 4 fixes the voltage to High or performs switching during the overlap energization period.

Concretely, the control part 4 performs energization switching setting as described below.

If the motor 20 is within a predetermined rotary speed range, the control part 4 outputs, to the pre-drive circuit 3 (a part of the motor driver), the drive control signal S4 to execute control, so that the performing and the stopping the overlap energization at the time of the energization switching are alternately repeated. According to the present disclosure, a phenomenon occurring once per one rotation as one cycle is regarded as a primary component. A cycle corresponding to the number of the energization switching n (energization switching number n) per one rotation of the rotor is defined as an n-degree component, and the predetermined rotary speed range includes a range where the n-degree component and a natural resonant frequency of the motor causes a resonant phenomenon.

The control part 4 outputs the driving control signal S4 to execute control, so that the performing and the stopping the overlap energization at the time of the energization switching are alternately repeated to reduce a power supply current I of the n-degree component corresponding to the energization switching number n per one rotation of the rotor. As a result, in the driving controller 1, the power supply current I of an (n/2)-degree component increases, while the power supply current I of the n-degree component decreases.

An operation of the thus configured motor driving controller will be explained below. First, the basic concept of the present disclosure will be explained.

Generally, in order to effectively drive the motor, a way is sought to unify a waveform of the power supply current in a uniform and homogeneous manner. However, if the waveform of the power supply current I is unified in a uniform and homogeneous manner, the energization timings are to be strictly aligned and, as a result, a certain fixed rotary degree (rotation order) component is generated.

For example, in a 4-pole 6-slot brushless motor, the energization switching takes place 12 times per rotation. Therefore, when the waveform of the power supply current I is analyzed by the FFT (Fast Fourier Transform), ideally, only a 12-degree component is generated. This 12-degree component resonates with a characteristic value (natural frequency) of the motor to become a large electromagnetic vibration component.

The number of energization switching per rotation is determined by multiplying ½ of the number of poles by the number of energization switching per pole (for example 6 times in case of the three phases).

Within a predetermined rotary speed range, the control part 4 of the motor driving controller according to the present disclosure outputs, to the motor driver, the drive control signal S4 to execute control, so that performing and stopping overlap energization at the time of energization switching are alternately repeated. In this manner, an n-degree component corresponding to the energization switching number n per rotation of the rotor, which is a factor of generation of an electromagnetic vibration component, is transferred to another degree component, so that the electromagnetic vibration component can be restricted.

For example, in case of a 4-pole 6-slot brushless motor, the control part 4 outputs, to the motor driver, the driving control signal S4 to execute control to alternately repeat overlap energization in every energization switching timing in a specific rotary speed region where the 12-degree component resonates with the inherent value of the motor, and then controls the energization waveform. In this manner, the power supply current I of a 6-degree component of the half frequency of the 12-degree component increases. While the power supply current I of the 6-degree component increases, the power supply current I of the 12-degree component is restricted. In this manner, resonation with the natural frequency of the motor can be avoided.

<Comparative Example>

Figure 2A:
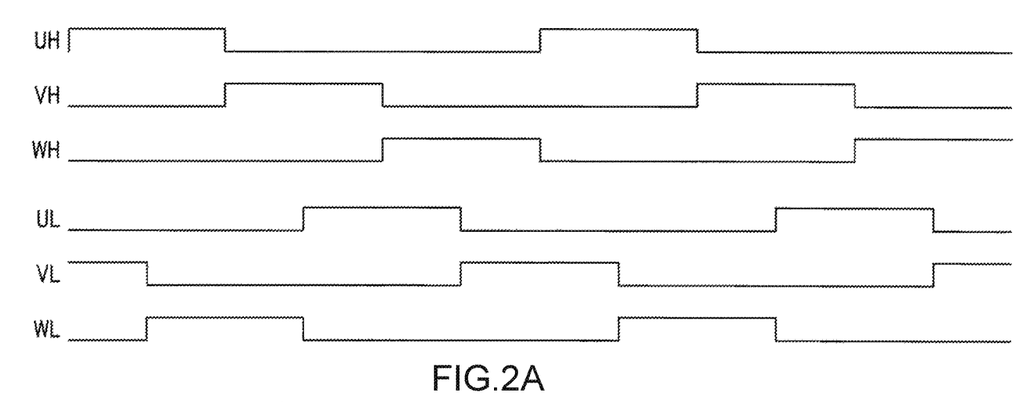
FIG. 2A and FIG. 2B show drive waveforms in a comparative example.
Figure 2B:
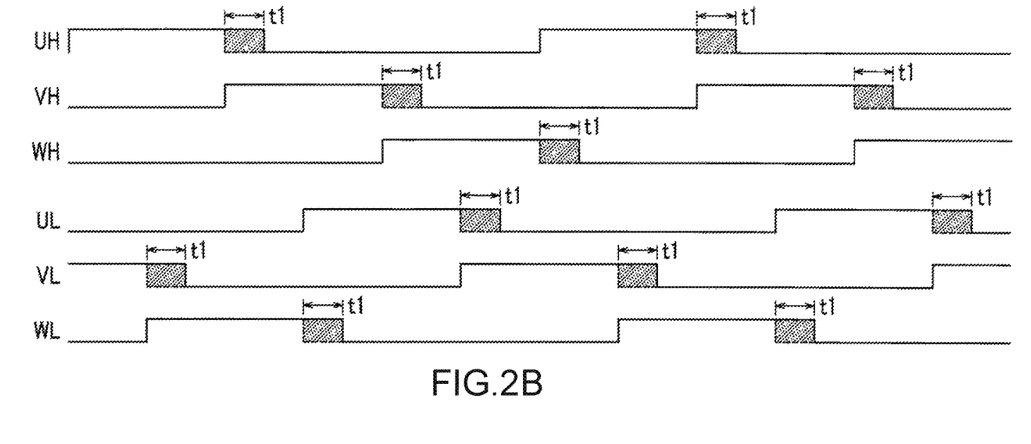

FIGS. 2A and 2B show drive waveforms in a comparative example.

FIG. 2A shows a drive waveform without overlapping.

A waveform UH indicates a drive signal Vuu, a waveform VH indicates a drive signal Vvu, and a waveform WH indicates a drive signal Vwu. The waveforms UH, VH and WH of these three drive signals repeat an H level by turns without overlapping.

Further, a waveform UL indicates a drive signal Vul, a waveform VL indicates a drive signal Vvl, and a waveform WL indicates a drive signal Vwl. The waveforms UL, VL and WL of these three drive signals repeat an H level by turns without overlapping.

At first, the waveforms UH and VL becomes the H level, and the power supply current I (see FIG. 1) flows to the ground via the switching element Q1, the coils Lu, Lv and the switching element Q4 from the DC power supply Vd.

Next, the waveform VL becomes the L level and the waveform WL becomes at the H level, and then the power supply current I flows to the ground via the switching element Q1, the coils Lu, Lw and the switching element Q6 from the DC power supply Vd.

Then, the waveform UH becomes the L level and the waveform WH becomes at the H level, and then the power supply current I flows to the ground via the switching element Q3, the coils Lv, Lw and the switching element Q6 from the DC power supply Vd.

Next, the waveform WL becomes the L level and the waveform UL becomes the H level, and then the power supply current I flows to the ground via the switching element Q3, the coils Lv, Lu and the switching element Q2 from the DC power supply Vd.

Then, the waveform VH becomes the L level and the waveform WH becomes the H level, and then the power supply current I flows to the ground via the switching element Q5, the coils Lw, Lu and the switching element Q2 from the DC power supply Vd.

Next, the waveform UL becomes the L level and the waveform VL becomes the H level, and then the power supply current I flows to the ground via the switching element Q5, the coils Lw, Lv and the switching element Q4 from the DC power supply Vd.

Thereafter, similarly, the switching elements Q1 to Q6 repeat on and off operations, so that the motor rotates. These on and off operations of the switching elements Q1 to Q6 increase the power supply current I of the 12-degree component of the motor 20.

FIG. 2B shows a drive waveform in an overlap energization system.

The waveforms UH, VH and WH repeat the H level by turns, while the waveforms UH, VH and WH overlap. The waveforms UL, VL and WHL repeat the H level by turns, while the waveforms UL, VL and WHL overlap.

At first, the waveforms UH and VL becomes the H level, and the power supply current I flows to the ground via the switching element Q1, the coils Lu, Lv and the switching element Q4 from the DC power supply Vd.

Next, the waveform WL becomes the H level, and then the power supply current I newly flows to the ground as well, via the switching element Q1, the coils Lu, Lw and the switching element Q6 from the DC power supply Vd. As described above, the power supply current I flows with overlapping over the two systems of the coils Lu, Lv and the coils Lu, Lw, and therefore this is called overlap energization system.

Thereafter, when the time t1 elapses, the waveform VL becomes the L level and the switching element Q4 is turned off. In this manner, the power supply current I flows to the ground, only via the switching element Q1, the coils Lu, Lw and the switching element Q6 from the DC power supply Vd.

Next, the waveform VH becomes the H level, and then the power supply current I newly flows to the ground as well, via the switching element Q3, the coils Lv, Lw and the switching element Q6 from the DC power supply Vd. Namely, the power supply current I flows with overlapping over the two systems, namely, the coils Lu, Lw and the coils Lv, Lw. Thereafter, when the time t1 elapses, the waveform UH becomes the L level and then the switching element Q1 is turned off. In this manner, the power supply current I flows to the ground, only via the switching element Q3, the coils Lv, Lw and the switching element Q6 from the DC power supply Vd.

Next, the waveform UL becomes the H level, and then the power supply current I newly flows to the ground as well, via the switching element Q3, the coils Lv, Lu and the switching element Q2 from the DC power supply Vd. Namely, the power supply current I flows with overlapping over the two systems, namely, the coils Lv, Lw and the coils Lv, Lu. Thereafter, when the time t1 elapses, the waveform WL becomes the L level and the switching element Q6 is turned off. In this manner, the power supply current I flows to the ground, only via the switching element Q3, the coils Lv, Lu and the switching element Q2 from the DC power supply Vd.

Next, the waveform WH becomes the H level, and then the power supply current I newly flows to the ground as well, via the switching element Q5, the coils Lw, Lu and the switching element Q2 from the DC power supply Vd. Namely, the power supply current I flows with overlapping over the two systems, namely, the coils Lv, Lu and the coils Lw, Lu. Thereafter, when the time t1 elapses, the waveform VH becomes the L level and then the switching element Q3 is turned off. In this manner, the power supply current I flows to the ground, only via the switching element Q5, the coils Lw, Lu and the switching element Q2 from the DC power supply Vd.

Next, the waveform VL becomes the H level, and then the power supply current I newly flows to the ground as well, via the switching element Q5, the coils Lw, Lv and the switching element Q4 from the DC power supply Vd. Namely, the power supply current I flows with overlapping over the two systems, namely, the coils Lw, Lu and the coils Lw, Lv. Thereafter, when the time t1 elapses, the waveform UL becomes the L level and then the switching element Q2 is turned off. In this manner, the power supply current I flows to the ground, only via the switching element Q5, the coils Lw, Lv and the switching element Q4 from the DC power supply Vd.

Thereafter, similarly, the switching elements Q1 to Q6 repeat on and off operations, so that the motor rotates. As described above, in the motor driving controller 1 performs the overlap energization in synchronization with the on and off operations of the switching elements Q1 to Q6, thereby to make the power supply current I of the 12-degree component of the motor 20 increase.

<The Present Embodiment>

Next, the operation of the motor driving controller according to the present embodiment will be explained.

Figure 3A:
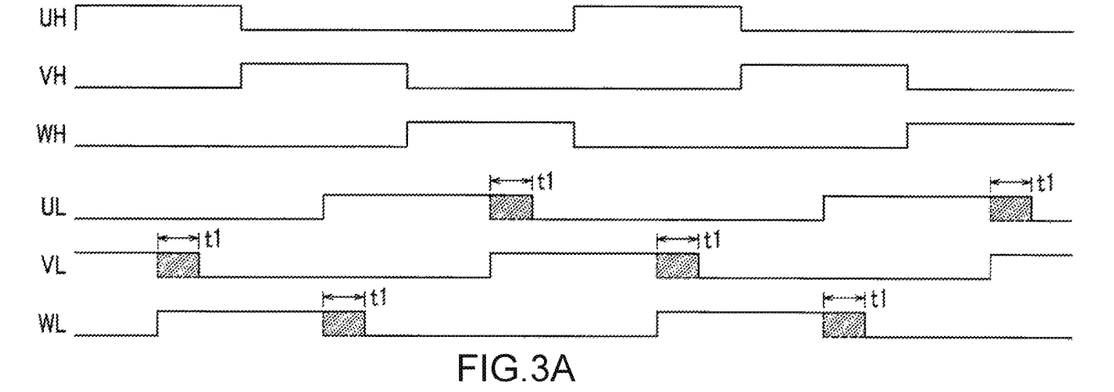
FIGS. 3A and 3B show driving waveforms in the present embodiment.
Figure 3B:
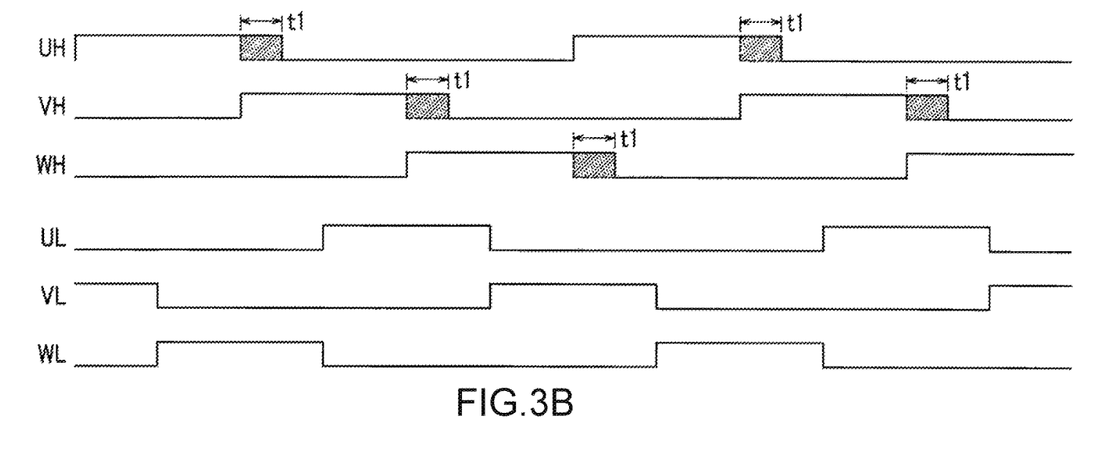

FIGS. 3A and 3B show driving waveforms in the present embodiment.

The driving waveforms shown in FIG. 3A perform the overlap energization over the time t1, only at the time of falling of the waveforms UL, VL and WL (in other words, when the energization time of the switching elements Q2, Q4 and Q6 on the lower arm side terminate). Namely, the control part 4 outputs, to the pre-drive circuit 3 (a part of the motor driver), the drive control signal S4 to execute control, so that performing and stopping the overlap energization operation at the time of energization switching are alternately repeated. By the above overlap energization operation, the power supply current I of the 6-degree component of the motor 20 can be increased and, instead, the power supply current I of the 12-degree component can be decreased.

The driving waveforms shown in FIG. 3B perform the overlap energization over the time t1, only at the time of falling of the waveforms UH, VH and WH (in other words, when the energization time of the switching elements Q1, Q3 and Q5 on the upper arm side terminate). Namely, the control part 4 outputs, to the pre-drive circuit 3 (a part of the motor driver), the drive control signal S4 to execute control, so that performing and stopping the overlap energization operation at the time of energization switching are alternately repeated. By the above overlap energization operation, the power supply current I of the 6-degree component of the motor 20 can be increased and, instead, the power supply current I of the 12-degree component can be decreased.

Figure 4:
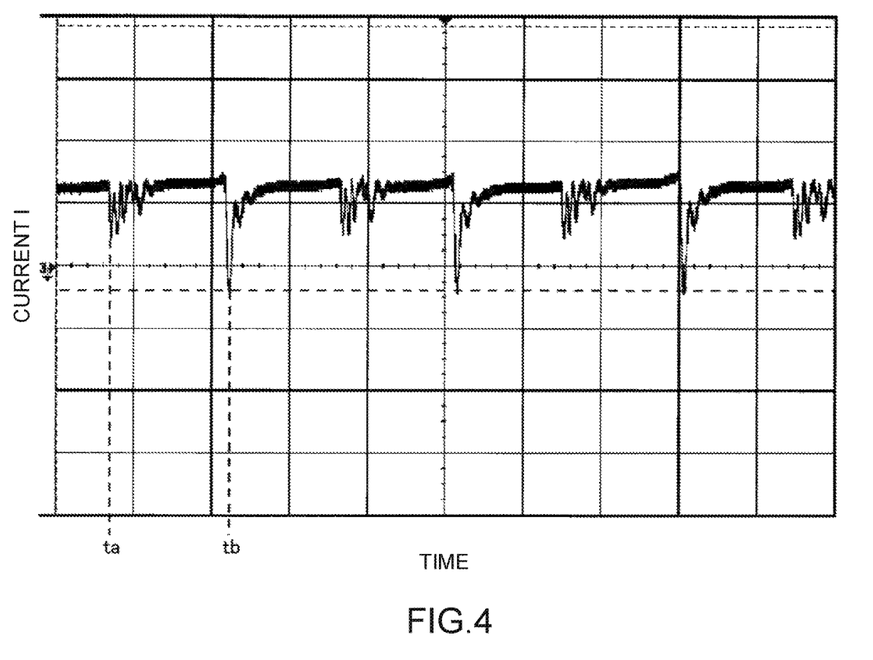
FIG. 4 is a power supply current waveform diagram of a brushless motor in the present embodiment.

FIG. 4 is a power supply current waveform diagram of the brushless motor in the present embodiment. The vertical axis of the waveform diagram indicates the power supply current I, and the horizontal axis indicates the time.

In this power supply current I, small amplitudes and large amplitudes appear alternately. The small amplitude at the time ta indicates a current value at the time of overlap energization. The large amplitude at the time tb indicates a current value at the time of stopping overlap energization. The control part 4 makes the motor driver stop the overlap energization once every two of the energization switching, so that the amplitude of the power supply current I at the time of stopping the overlapping energization becomes large. Namely, while the overlap energization has the effect of restricting the amplitude of the power supply current I at the time of energization switching, the overlap energization is stopped once every two of the energization switching, so that the amplitude of the power supply current I becomes large ever once every two of the energization switching. By controlling the waveform of the power supply current I at the time of energization switching as described above, it is possible to increase the 6-degree component and reduce the 12-degree component.

Figure 5A:
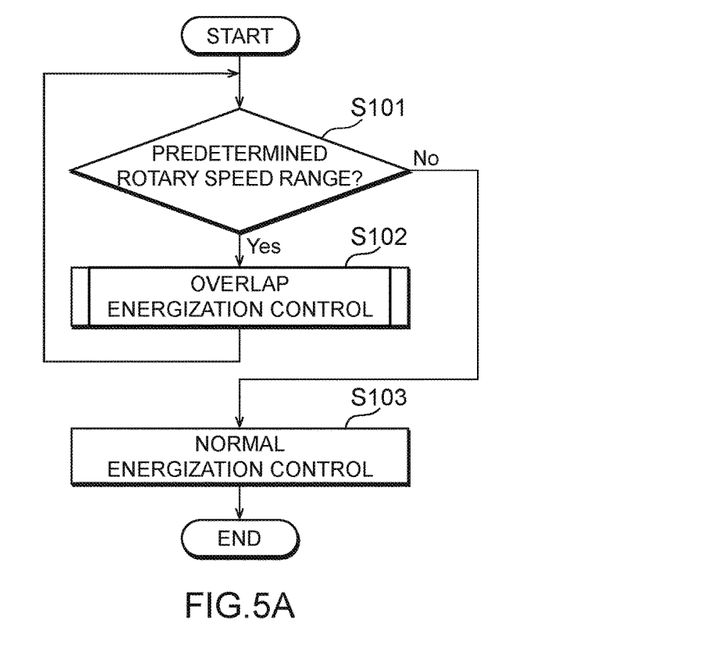
FIG. 5A shows a main flow, and FIGS. 5B, C show sub-routines for energization switching.
Figure 5B:
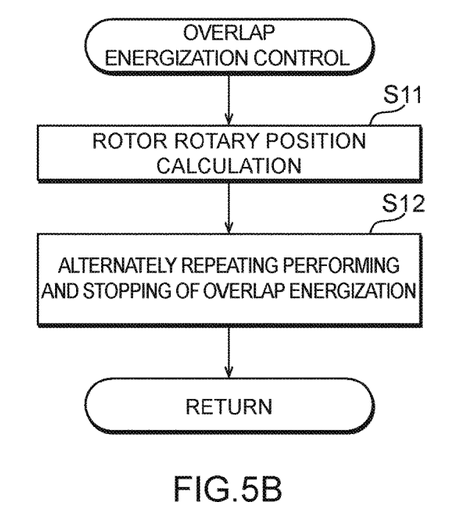
Figure 5C:
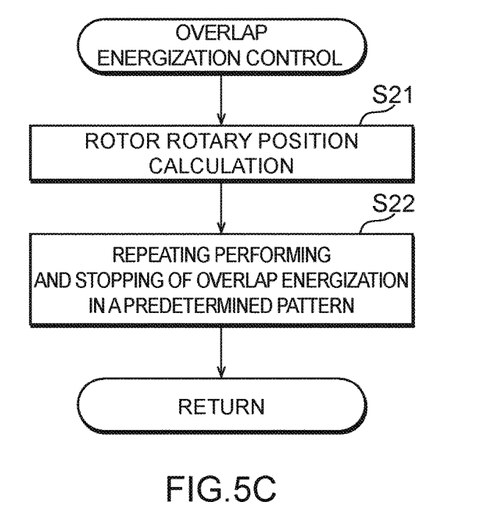

FIGS. 5A to 5C are flowcharts showing the energization control of the motor driving controller 1 in the present embodiment. FIG. 5A shows a main flow, FIG. 5B shows a sub-routine of the present embodiment relating to the energization switching in step S102, and FIG. 5C shows a sub-routine of a first variation.

The flow in FIG. 5A is repeatedly executed in every predetermined timing in the control part 4 (see FIG. 1).

As shown in FIG. 5A, in step S101, the control part 4 discriminates whether or not the motor 20 (see FIG. 1) is within a predetermined rotary speed range. The predetermined rotary speed range includes a range where an n-degree component corresponding to the energization switching umber n per rotation of a rotor and the natural resonant frequency of the motor 20 cause a resonance phenomenon. The rotary speed of the motor 20 is calculated in such a manner that the rotary position detection part 41 (see FIG. 1) generates the position detection signal S1 corresponding to rotary position information (phase voltage V1, V2 and V3) from the rotary position detection circuit 5, and the rotary speed calculation part 42 calculates a rotary speed on the basis of the position detection signal S1 to generate the rotary speed information S2.

If the motor 20 is within the predetermined rotary speed range (YES in step S101), in order to restrict an electromagnetic vibration component resonating with the natural frequency of the motor 20, the control part 4 executes overlap energization control in step S102. Concretely, on the basis of the rotary speed information S2 outputted from the rotary speed calculation part 42, the energization system command part 43 generates the energization command signal S3 to give a command, so that performing and stopping the overlap energization at the time of energization switching is repeated in the predetermined rotary speed range alternately or in a predetermined pattern. The energization signal generation part 44 receives the position detection signal S1 and the energization command signal S3, and generates the drive control signal S4 to execute control, so that performing and stopping the overlap energization at the time of energization switching are repeated alternately of in the predetermined pattern. The overlap energization control in above step S102 is control to execute performing and stopping the overlap energization in the predetermined pattern within the predetermined rotary speed range, forcibly. The details will be explained in connection with FIGS. 5B and 5C mentioned below.

The control part 4 executes the overlap energization control and, thereafter, the process returns to step S101. While the motor 20 is within the predetermined rotary speed range (YES in step S101), the control part 4 continues the process of the overlap energization control in step S102.

On the other hand, when the motor 20 is not within the predetermined rotary speed range in step S101 (in case of NO), the control part 4 skips the overlap energization control in step S102 and the procedure proceeds to step S103.

In step S103, the control part 4 executes normal energization control and the present flow terminates.

Next, the overlap energization control will be explained. The overlap energization control is control to adjust the power supply current I by repeating the performing and stopping of the overlap energization at the time of energization switching in the predetermined pattern. The overlap energization control is exemplified as follows.

<The Present Embodiment>

As shown in FIG. 5B, in step S11, the rotary position detection part 41 calculates the rotary position of the rotor.

In step S12, the energization system command part 43 alternately repeats performing and stopping the overlap energization at the time of energization switching on the basis of the rotary position of the rotor. Concretely, the energization signal generation part 44 in the control part 4 receives the position detection signal S1 outputted from the rotary position detection part 41 and the energization command signal S3 outputted from the energization system command part 43, and then generates the drive control signal S4 to execute control, so that performing and stopping the overlap energization at the time of energization switching are alternately repeated. The energization signal generation part 44, thereafter, outputs the drive control signal S4 to the pre-drive circuit 3 (a part of the motor driver).

In this manner, the motor driving controller 1 can increase the power supply current I of the (n/2)-degree component and reduce the power supply current I of the n-degree component. For example, the power supply current I of the 6-degree component is increased, and the power supply current I of the 12-degree component is reduced.

<First Variation>

As shown in FIG. 5C, in step S21, the rotary position detection part 41 calculates the rotary position of the rotor.

In step S22, control is executed in such a manner that the energization system command part 43 repeats performing and stopping the overlap energization at the time of energization switching in a predetermined pattern on the basis of the rotary position of the rotor. Concretely, the energization signal generation part 44 in the control part 4 receives the position detection signal S1 outputted from the rotary position detection part 41 and the energization command signal S3 outputted from the energization system command part 43, and then generates the drive control signal S4 to execute control, so that performing and stopping the overlap energization at the time of energization switching are repeated in a predetermined pattern. The energization signal generation part 44, thereafter, outputs the drive control signal S4 to the pre-drive circuit 3 (a part of the motor driver). The predetermined pattern includes, for example, a pattern of repeating one-time execution of the overlap energization and three-times stop of the overlap energization as well as a pattern of repeating three-times execution of the overlap energization and one-time stop of the overlap energization. The predetermined pattern, however, is not limited to these patterns.

By this configuration as well, it is possible to reduce the power supply current I of the n-degree component, when the number of energization switching per rotation of the rotor is represented by $n$.

Figure 6:
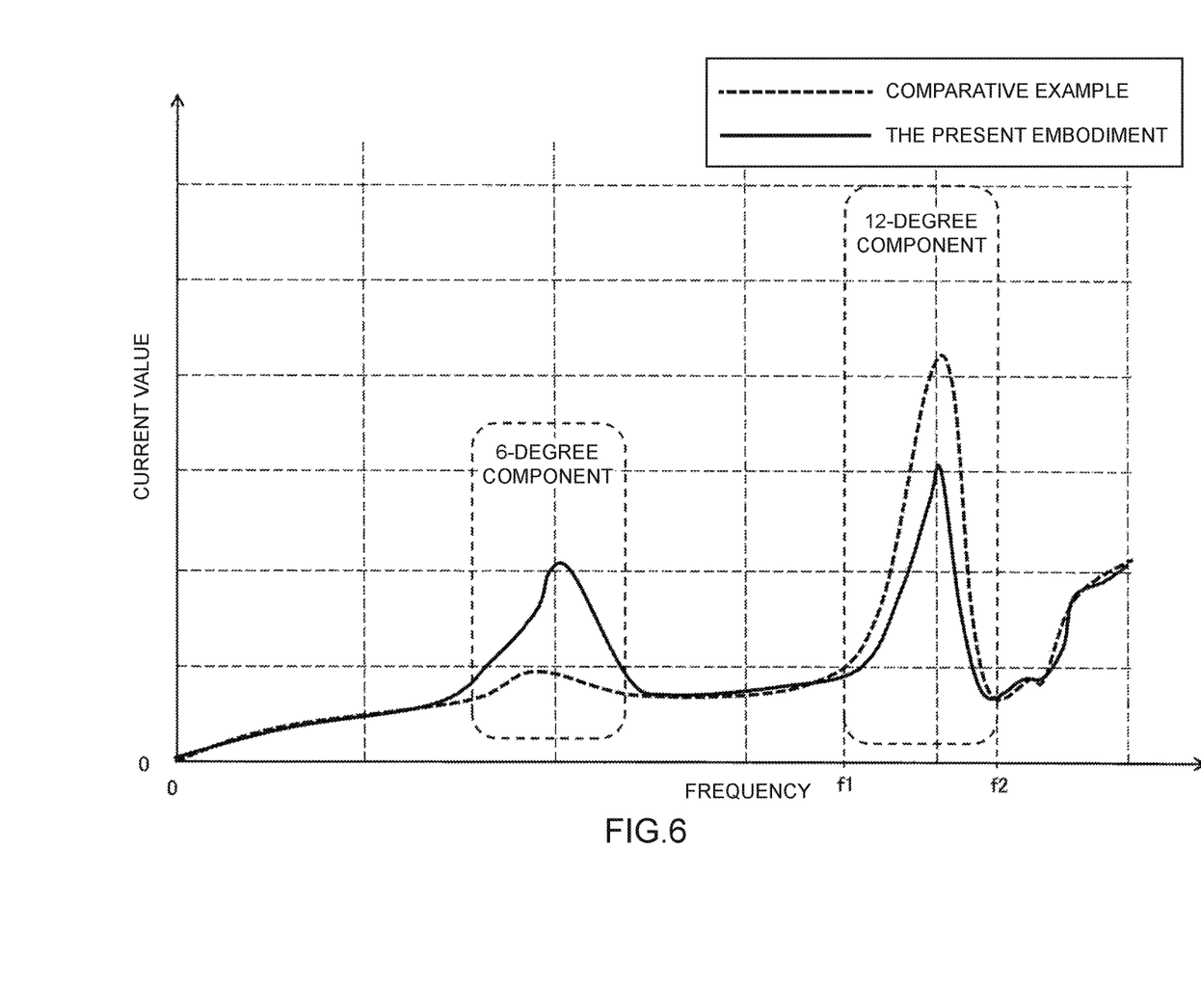
FIG. 6 is a conceptual drawing showing a characteristic between frequency and a current value of the motor driving controller.

FIG. 6 is a conceptual drawing showing a characteristic between frequency versus and current value of the motor driving controller 1.

FIG. 6 shows a concept of an FFT graph of a waveform of the power supply current I acquired by sweeping the rotary speed in a 4-pole 6-slot brushless motor. The vertical axis of FIG. 6 indicates a current value of the power supply current I in FIG. 1, and the horizontal axis indicates a frequency. The solid line in FIG. 6 represents an FFT graph of the current waveform in the present embodiment, and the broken line represents an FFT graph of a current waveform in a comparative example.

As shown by the FFT graph of FIG. 6, in the comparative example, the power supply current I of the 12-degree component is generated, accompanied by the 12-times energization switching per rotation of a rotor. As described above, the power supply current I of this 12-degree component resonates with the characteristic value (natural frequency) of the motor 20 to thereby become a large electromagnetic vibration component.

According to the present embodiment, executing and stopping the overlap energization at the time of energization switching are alternately repeated, so that the power supply current I of the 6-degree component is increased and the power supply current I of the 12-degree component is reduced.

When the rotary speed of the motor 20 continues to be changed, a phenomenon of resonating with the natural frequency of the motor 20 occurs within a predetermined rotary speed range and within a frequency range equivalent to an n-degree component corresponding to the energization switching number n. According to the present embodiment, the power supply current I is restricted within the frequency range, so that resonance at the n-degree component can be avoided.

As shown by the region enclosed by the broken line in FIG. 6, in the motor driving controller 1 according to the present embodiment, a current value in the frequency range corresponding to the 12-degree component is restricted. In FIG. 6, in a section of a predetermined rotary speed range, executing and stopping the overlap energization at the time of energization switching are alternately repeated to avoid resonance between the natural frequency of the motor 20 and the 12-degree component.

However, as shown in FIG. 6, in the motor driving controller 1 according to the present embodiment, the 6-degree component is to be increase. However, this 6-degree component does not resonate with the inherent value (natural frequency) of the motor 20, and therefore an electromagnetic vibration component is not generated. Further, a frequency region near the 6-degree component has no influence on the system, because the current value is small.

In the present embodiment, a method for calculating a rotary speed range corresponding to the 12-degree component will be explained.

It is assumed that the inherent value (the natural frequency) of the motor 20 is known by conducting measurement. Resonation with this natural frequency generates a large electromagnetic vibration component. In case of FIG. 6, a resonant point (electromagnetic vibration component) exists between $f_1$ [Hz] and $f_2$ [Hz]. When they are converted to the rotary speeds, $f_1$ [Hz]*60/12=5*$f_1$ [rpm] and $f_2$ [Hz]*60/12=5*$f_2$ [rpm].

Namely, the lower limit Rmin[rpm] and the upper limit Rmax[rpm] of the rotary speed range where the frequency range of the n-degree component corresponds to $f_1$ [Hz] to $f_2$ [Hz] are ($f_1*60/n$) [rpm] and ($f_2*60/n$) [rpm], respectively.

Then, the predetermined rotary speed range is set to include at least the rotary speed range corresponding to the n-degree component, namely, a range where the n-degree component corresponding to the energization switching number n per rotation of the rotor and the natural resonant frequency of the motor 20 cause a resonance phenomenon.

Figure 7A:
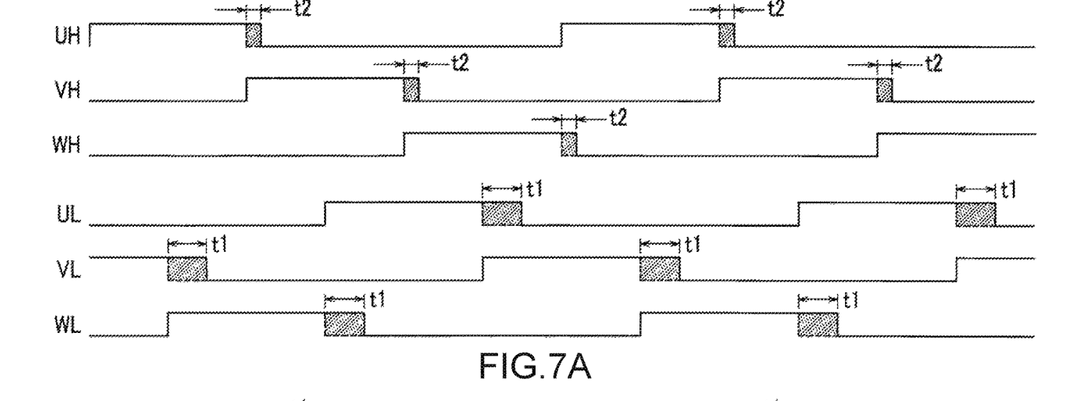
FIGS. 7A and 7B show driving waveforms in a variational example.
Figure 7B:
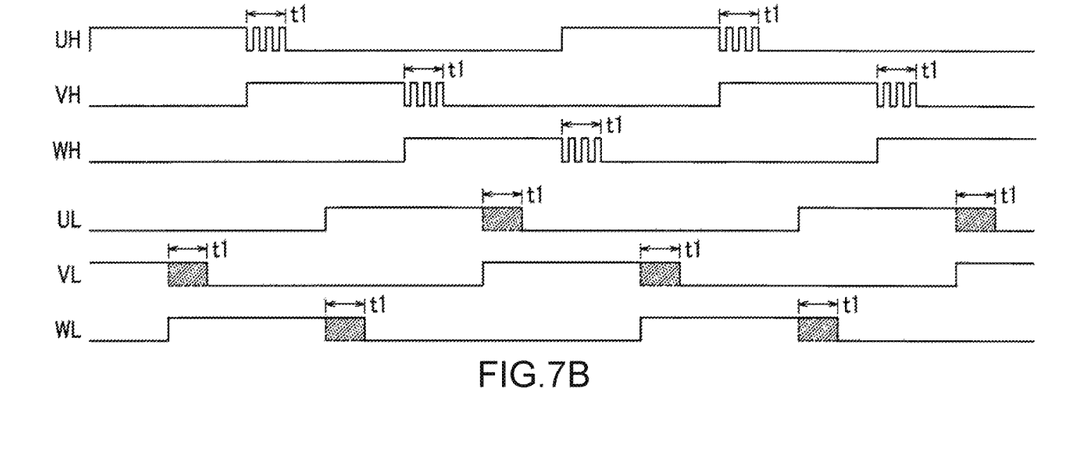

FIGS. 7A and 7B show driving waveforms in a variation.

Driving waveforms of a second variation shown in FIG. 7A show that the overlap energization takes place over the time t2 at the time of falling of the waveforms UH, VH and WH and the overlap energization takes place over the time t1 at the time of falling of the waveforms UL, VL and WL.

Namely, at the time of energization switching, the control part 4 executes control to alternately repeat the overlap energization during the time t2 and the overlap energization during the time t1. The control part 4 makes the time t2 shorter than the time t1, thereby to make the amplitude of the power supply current I larger during the time t2 than the amplitude during the time t1. By properly setting the ratio of the time t1 to the time t2, the amplitude of the power supply current I can be made large every once every two of the energization switching. By the above overlap energization operation of repeating the operations with the different energization periods in a predetermined pattern, the motor driving controller 1 can increase the power supply current I of the 6-degree component of the motor 20 and, instead, decrease the power supply current I of the 12-degree component.

Driving waveforms shown in FIG. 7B show that the overlap energization takes place while switching is performed at the time of falling of the waveforms UH, VH and WH (in other words, at the time of termination of the energization periods of the switching elements Q1, Q3 and Q5 on the upper arm side) and the overlap energization takes place without performing switching at the time of falling of the waveforms UL, VL and WL (in other words, at the time of termination of the energization periods of the switching elements Q2, Q4 and Q6 on the lower arm side). Namely, the control part 4 executes control in such a manner that operations of presence or absence of switching (operations including switching and not including switching) are alternately repeated by the overlap energization operation at the time of energization switching.

During the overlap energization period including switching, an on-duty ratio of a switching pulse and a switching frequency are appropriately set. As a result, the control part 4 can make the amplitude of the power supply smaller during the period including switching than during the period not including switching, and the amplitude of the power supply current I can be increased every once every two of the energization switching.

By the above overlap energization operation, the motor driving controller 1 can increase the power supply current I of the 6-degree component of the motor 20 and, instead, can decrease the power supply current I of the 12-degree component.

Figure 8A:
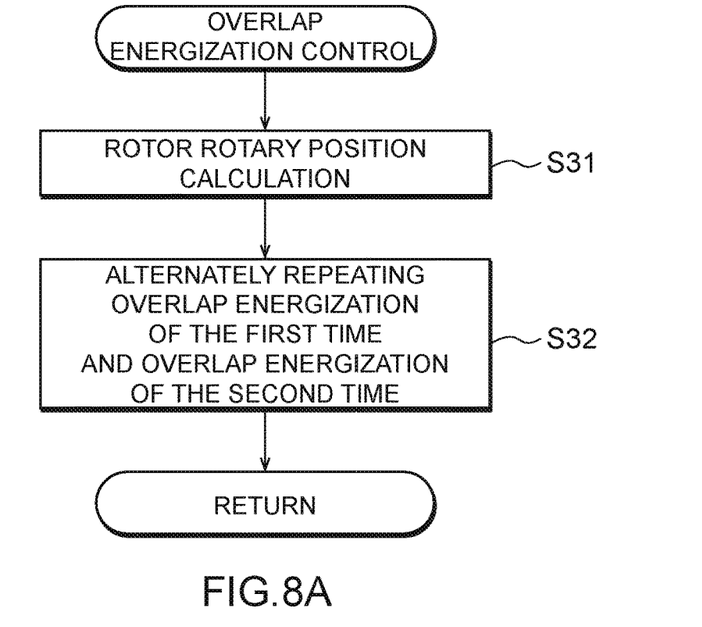
FIG. 8A shows a main flow.
Figure 8B:
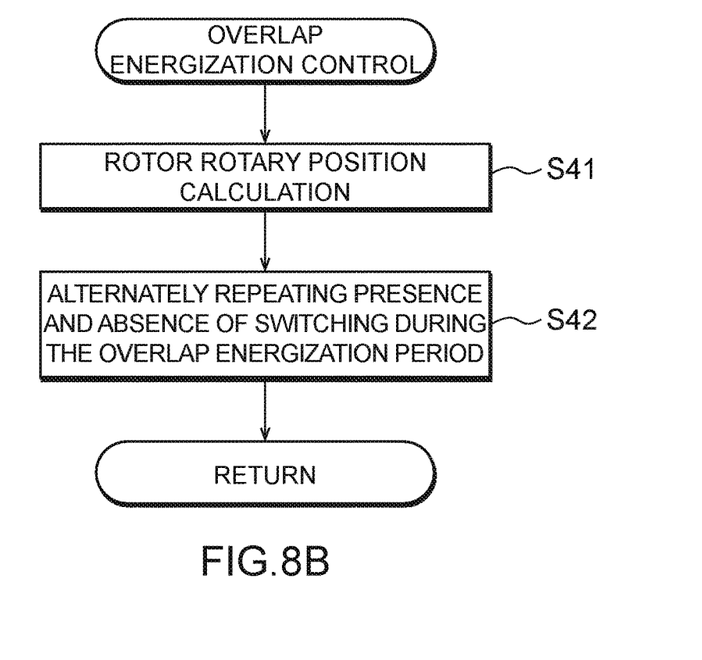
FIG. 8B shows sub-routines for energization switching.

FIGS. 8A and 8B are flowcharts showing the energization control of the motor driving controller 1 according to the variations. FIG. 8A shows a sub-routine of the energization switching in the second variation, and FIG. 8B shows a sub-routine of the energization switching in the third variation. In the second and third variations as well, the energization switching by the main flow shown in FIG. 5A is executed, and the sub-routines shown in FIGS. 8A and 8B are called.

As shown in FIG. 8A, in step S31, the rotary position detection part 41 calculates the rotary position of the rotor.

In step S32, the energization system command part 43 executes control in such a manner that performing and stopping the overlap energization in the first time (time t1) and the overlap energization in the second time (time t2) at the time of energization switching are alternately repeated on the basis of the rotary position of the rotor. Concretely, the energization signal generation part 44 in the control part 4 receives the position detection signal S1 outputted from the rotary position detection part 41 and the energization command signal S3 outputted from the energization system command part 43, and then generates the drive control signal S4 to execute control, so that the overlap energization in the first time (time t1) and the overlap energization in the second time (time t2) are alternately repeated at the time of energization switching. The energization signal generation part 44, then, outputs the drive control signal S4 to the pre-drive circuit 3 (a part of the motor driving part). Therefore, the waveform shown in FIG. 7A are generated.

In this manner, the motor driving controller 1 can increase the power supply current I of the (n/2)-degree component and reduce the power supply current I of the n-degree component. For example, the motor driving controller 1 increases the power supply current I of the 6-degree component, and reduces the power supply current I of the 12-degree component.

As shown in FIG. 8B, in step S41, the rotary position detection part 41 calculates the rotary position of the rotor.

In step S42, the energization system command part 43 executes control in such a manner that the presence and absence of switching in the overlap energization operation at the time of energization switching are alternately repeated on the basis of the rotary position of the rotor. Concretely, the energization signal generation part 44 in the control part 4 receives the position detection signal S1 outputted from the rotary position detection part 41 and the energization command signal S3 outputted from the energization system command part 43, and then generates the drive control signal S4 to execute control, so that the presence and absence of switching in the overlap energization operation at the time of energization switching are alternately repeated. The energization signal generation part 44, then, outputs the drive control signal S4 to the pre-drive circuit 3 (a part of the motor driver). Therefore, the waveforms shown in FIG. 7B are generated.

By this configuration, the motor driving controller 1 can reduce the power supply current I of the n-degree component, when the number of energization switching per rotation of the rotor is represented by n.

(Variation)

The present disclosure is not limited to the above embodiment as well as can be varied and embodied, as far as it does not deviate from the gist of the present disclosure. For example, the present disclosure includes variations as described in (a) to (k) below.

(a) The predetermined rotary speed range should be set appropriately and properly in relation to a resonance point with a natural frequency of a motor used, and is not limited directly. The present disclosure is characterized in that, at the time of energization switching, the overlap energization operation is repeated in a predetermined pattern. Accordingly, the present disclosure can be applied in any rotary speed range.

(b) In the respective components of the driving controller, at least part of each of the components may not be implemented by hardware, but be implemented by software.

(c) In the present embodiment, it is explained that the motor 20 is a 4-pole 6-slot brushless motor, while the number of poles, the number of slots and the type of a motor are not particularly limited. Further, the number of phases of the motor 20, too, is not particularly limited.

(d) The rotary position detection circuit is not limited to the present embodiment (the detection circuit of counter electromotive force) and may be, for example, a Hall sensor. The rotary position information, too, is not limited to the phase voltage.

(e) In the driving controller, at least part of the driving controller may be configured as an integrated circuit (IC).

(f) The circuit block configuration of the driving controller shown in FIG. 1 is a concrete example and is not limited to this example.

(g) The control flows shown in FIGS. 5A to 5C and 8A, 8B are examples and are not limited to the processes of these steps. For example, another process may be inserted between the respective steps.

(h) The overlap amount (time) may be arbitrarily adjusted to become a proper value.

(i) The present disclosure is not limited to the 120-degrees energization operation.

(j) Changing the overlap time may be combined with the presence and absence of switching.

(k) In the variation shown in FIGS. 7A and 7B, the operations on the upper arm side and the lower arm side may be replaced with each other.

What is claimed is:

1. A motor driving controller, comprising:
a motor driver applying voltage to each phase of a motor and driving the motor,
a rotary position detection circuit detecting a rotary position of a rotor and generating rotary position information, and
a control part outputting, to the motor driver, a driving control signal to execute control based on the detected rotary position information, so that an overlap energization operation at a time of energization switching is repeated in a predetermined pattern, wherein, if the motor is within a predetermined rotary speed range, the control part outputs the drive control signal to execute control, so that performing and stopping overlap energization at the time of energization switching are repeated in the predetermined pattern.

2. The motor driving controller according to claim 1, wherein, if the motor is within the predetermined rotary speed range, the control part outputs the drive control signal to execute control, so that the performing and the stopping overlap energization at the time of energization switching are repeated alternately.

3. The motor driving controller according to claim 1, wherein the predetermined rotary speed range includes a range where an n-degree component corresponding to an energization switching number n per one rotation of the rotor and a natural resonant frequency of the motor cause a resonance phenomenon.

4. The motor driving controller according to claim 3, wherein
the control part outputs the driving control signal so that a power supply current of the n-degree component is reduced.

5. The motor driving controller according to claim 3, wherein the control part increases a power supply current of an (n/2)-degree component and reduces a power supply current of the n-degree component.

6. The motor driving controller according to claim 1, wherein
the control part comprises:
a rotary speed calculation part calculating a rotary speed based on a signal corresponding to the rotary position information;
an energization system command part generating an energization command signal to command execution and stop of overlap energization at the time of energization switching based on rotary speed information outputted from the rotary speed calculation part; and
an energization signal generation part generating the driving control signal by input of a signal corresponding to the rotary position information and input of the energization command signal.

7. A motor driving controller, comprising
a motor driver applying voltage to each phase of a motor and driving the motor,
a rotary position detection circuit detecting a rotary position of a rotor and generating rotary position information, and
a control part outputting, to the motor driver, a driving control signal to execute control based on the detected rotary position information, so that an overlap energization operation at a time of energization switching is repeated in a predetermined pattern, wherein, if the motor is within a predetermined rotary speed range, the control part outputs the drive control signal to execute control, so that different predetermined operations are repeated in overlap energization at the time of energization switching in a predetermined pattern.

8. The motor driving controller according to claim 7, wherein the different predetermined operations include operations each having different overlap energization periods or/and operations of presence and absence of switching during the overlap energization.

9. The motor driving controller according to claim 7, wherein, if the motor is within the predetermined rotary speed range, the control part outputs the drive control signal to execute control, so that the different predetermined operations are alternately repeated in the overlap energization at the time of energization switching.

10. The motor driving controller according to claim 7, wherein the predetermined rotary speed range includes a range where an n-degree component corresponding to an energization switching number n per one rotation of the rotor and a natural resonant frequency of the motor cause a resonance phenomenon.

11. The motor driving controller according to claim 10, wherein
the control part outputs the driving control signal so that a power supply current of the n-degree component is reduced.

12. The motor driving controller according to claim 10, wherein
the control part increases a power supply current of an (n/2)-degree component and reduces a power supply current of the n-degree component.

* * * * *